(12) United States Patent
Kim et al.

(10) Patent No.: US 10,921,936 B2
(45) Date of Patent: Feb. 16, 2021

(54) LIQUID CRYSTAL DISPLAY DEVICE ASSOCIATED WITH TOUCH PANEL

(75) Inventors: Tae-Hwan Kim, Seoul (KR); Min-Woo Hwang, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 884 days.

(21) Appl. No.: 12/967,158

(22) Filed: Dec. 14, 2010

(65) Prior Publication Data
US 2011/0304564 A1 Dec. 15, 2011

(30) Foreign Application Priority Data
Jun. 10, 2010 (KR) .................. 10-2010-0055118

(51) Int. Cl.
*G06F 3/044* (2006.01)
*G09G 3/36* (2006.01)

(52) U.S. Cl.
CPC ............ *G06F 3/044* (2013.01); *G09G 3/3611* (2013.01); *G09G 2300/0426* (2013.01); *G09G 2330/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,134,676 B2* | 3/2012 | Shim | ............................ | 349/150 |
| 8,395,738 B2* | 3/2013 | Asada | .................... | G02F 1/1345 |
| | | | | 349/139 |
| 2002/0054261 A1* | 5/2002 | Sekiguchi | ........... | G02F 1/13338 |
| | | | | 349/122 |
| 2004/0130538 A1* | 7/2004 | Lin | ..................... | G02F 1/13338 |
| | | | | 345/178 |
| 2008/0062139 A1* | 3/2008 | Hotelling et al. | ............ | 345/173 |
| 2008/0150901 A1* | 6/2008 | Lowles | ............... | G02F 1/13338 |
| | | | | 345/173 |
| 2008/0180584 A1* | 7/2008 | Utsunomiya | ......... | G06F 3/0412 |
| | | | | 349/12 |
| 2009/0322704 A1* | 12/2009 | Anno | ............................ | 345/174 |
| 2010/0026662 A1* | 2/2010 | Oohira | ................ | G02F 1/13338 |
| | | | | 345/174 |

(Continued)

FOREIGN PATENT DOCUMENTS

| | | |
|---|---|---|
| JP | 2010-113498 A | 5/2010 |
| KR | 10-2006-0109537 A | 10/2006 |

*Primary Examiner* — William Boddie
*Assistant Examiner* — Alecia D. English
(74) *Attorney, Agent, or Firm* — Birch, Stewart, Kolasch & Birch, LLP

(57) ABSTRACT

To block noise and achieve slimness and integration, a liquid crystal display device includes according to an embodiment a liquid crystal panel including first and second substrates and a liquid crystal layer formed therebetween, a shielding electrode formed throughout the entire rear surface of the second substrate of the liquid crystal panel, a first polarizing plate formed on the shielding electrode, a third substrate formed above the first polarizing plate and including intersecting first and second electrodes, a touch FPC including a touch drive IC to control driving and sensing of the first and second electrodes, and a printed circuit board formed at one side of the liquid crystal panel and generating a main panel control signal to control driving of the liquid crystal panel, a touch control signal to control the touch drive IC, and a voltage signal.

16 Claims, 9 Drawing Sheets

(56) References Cited

U.S. PATENT DOCUMENTS

2010/0072582 A1* 3/2010 Chandra ............... H01L 21/561
                                                                 257/659
2011/0074729 A1* 3/2011 Im ........................ G06F 3/0412
                                                                  345/174

* cited by examiner

LIQUID CRYSTAL DISPLAY DEVICE ASSOCIATED WITH TOUCH PANEL

This application claims the priority benefit of Korean Patent Application No. 10-2010-0055118, filed on Jun. 10, 2010, which is hereby incorporated by reference as if fully set forth herein.

BACKGROUND OF THE INVENTION

Field of the Invention

The present invention relates to a liquid crystal display device, and more particularly, to a liquid crystal display device associated with a touch panel in which an electrode is formed on the rear surface of a color filter substrate of a liquid crystal panel so as to block noise and achieve slimness and integration, simultaneously.

Discussion of the Related Art

Recently, as the information age has arrived in earnest, a display field to visually express electric information signals has been rapidly developed. In order to satisfy such a trend, various flat display devices having excellent performance of a thin-profile, a light-weight, and low-power consumption have been developed and have quickly replaced conventional cathode ray tubes.

As examples of the flat display devices, there are Liquid Crystal Display devices (LCDs), Plasma Display Panel devices (PDPs), Field Emission Display devices (FEDs), and ElectroLuminescent Display devices (ELDs). Each of these flat display devices essentially includes a flat display panel to form an image, and the flat display panel is configured such that a pair of transparent insulating substrates is bonded to each other while interposing a light-emitting or light-polarizing material layer therebetween.

Among the flat display devices, a liquid crystal display device displays an image by adjusting light transmittance of liquid crystals using an electric field. For this purpose, the liquid crystal display device includes a display panel having liquid crystal cells, a backlight unit to irradiate light onto the display panel, and a driving circuit to drive the liquid crystal cells.

The display panel includes a plurality of gate lines and a plurality of data lines intersecting each other to define a plurality of unit pixel regions. Each pixel region is provided with a thin film transistor array substrate and a color filter array substrate that are positioned opposite to each other, spacers located to maintain a regular cell gap between the two substrates, and liquid crystals filling the cell gap.

The thin film transistor array substrate includes the gate lines and the data lines, thin film transistors formed as switching elements at intersections of the gate lines and the data lines, pixel electrodes respectively formed in units of the liquid crystal cells, and an alignment film applied thereto. The gate lines and the data lines receive signals from the driving circuit through respective pad units.

The thin film transistors supply pixel voltage signals, supplied to the data lines in response to scan signals supplied to the gate lines, to the pixel electrodes.

The color filter array substrate includes color filters formed in units of the liquid crystal cells, a black matrix serving to divide color filters from each other and to reflect external light, a common electrode to supply reference voltage to the liquid crystal cells in common, and an alignment film applied thereto.

The separately manufactured thin film transistor array substrate and color filter array substrate are aligned and are bonded to each other, and then liquid crystals are injected into a gap between the substrates and are sealed. Thereby, the liquid crystal display device is completed.

Recently, demand for addition of a touch panel, which recognizes a touched region through a human hand or a separate input unit and transmits separate data in response to such recognition, has been increased. Such a touch panel is generally attached to the external surface of the liquid crystal display device.

Touch panels are divided into a resistive type, a capacitive type, and an infrared sensing type according to touch sensing methods thereof. In consideration of ease in manufacture and sensing force, the capacitive type touch panel is a focus of attention at present.

Hereinafter, a general liquid crystal display device will be described with reference to the accompanying drawings.

FIG. 1 is a longitudinal-sectional view of a general liquid crystal display device with a touch panel attached thereto.

As shown in FIG. 1, the general liquid crystal display device includes a liquid crystal panel 10 including first and second substrates 1 and 2 positioned opposite to each other, a liquid crystal layer 3 filling a gap between the first and second substrates 1 and 2, and first and second polarizing plates 4a and 4b attached to the rear surfaces of the first substrate 1 and the second substrate 2, a touch panel 20 placed on the liquid crystal panel 10 and driven in a capacitive type, and a cover glass 30 to protect the upper surface of the touch panel 20.

A thin film transistor array including gate lines and data lines intersecting each other to define pixel regions, thin film transistors (TFTs) formed at intersections between the gate lines and the data lines, and pixel electrodes (not shown) formed in the pixel regions is formed on the first substrate 1 of the liquid crystal panel 10.

Further, a black matrix layer, a color filter layer, a common electrode (not shown), to which voltage Vcom is applied, are formed on the second substrate 2.

Here, the internal structure of the touch panel 20 varies according to the driving type thereof. For example, the capacitive type means a method in which touch is sensed using variation in capacitance at a touch point. In the structure of such a type, intersecting first and second electrodes are formed on a substrate, an insulating film is interposed between the first and second electrodes, and thus touch is sensed according to variation of capacitance formed between these electrodes when touched.

Further, in order to protect the touch panel 20, the cover glass 30 is formed on the upper surface of the touch panel 20.

If the touch panel 20 is attached directly to the liquid crystal panel 10, as described above, noise generated by the driving of the liquid crystal panel 10 is transmitted to the touch panel 20, thereby being capable of lowering touch sensing efficiency and causing a difficulty in touch sensing. Therefore, efforts to solve the above problems have been made.

FIG. 2 is a longitudinal-sectional view illustrating a shielding method in the general liquid crystal display device with the touch panel attached thereto.

As shown in FIG. 2, in order to prevent driving of the liquid crystal panel 10 from interfering with operation of the touch panel 20, a shielding layer 72 is formed on the rear surface of the touch panel 20.

That is, a touch panel glass substrate 70 constituting the touch panel 20 includes a plurality of sensing electrodes for touch sensing, and the transparent electrode 72 is formed throughout the entire lower (rear) surface of the touch panel glass substrate 70. Thereafter, an insulating film 73 to protect the electrode 72 formed on the lower surface of the touch panel glass substrate 70 and to prevent noise from being introduced into the touch panel glass substrate 70 is further formed on the lower surface of the touch panel glass substrate 70, and the insulating film 73 is selectively removed, thereby forming a contact hole 74 to expose a designated region of the transparent electrode 72. Here, the connection hole 74 is used to apply ground voltage, and is connected to a drive IC (not shown) of the touch panel 20.

However, in this case, shielding between the touch panel 20 and the liquid crystal panel 10 is achieved, but the separate insulting film 73 is required. Further, patterning of the insulating film 73 on the rear surface of the touch panel glass substrate 70 so as to enable signal application is required, and thereby, additional processes and materials are required and transmittance is lowered.

Further, if electrodes are formed on both surfaces of the touch panel glass substrate 70, the touch panel glass substrate 70 needs to be turned over during processes, and thereby, process time is increased and occurrence of process defects, such as generation of scratches or foreign substances, is also increased.

Here, non-described reference numerals 40, 50, 51 and 62 respectively correspond to the first substrate, the second substrate, the first polarizing plate and the second polarizing plate, shown in FIG. 1, and non-described reference numeral 45 represents a seal pattern located at the edges of the first and second substrates 40 and 50 to bond the first and second substrates 40 and 50 to each other while defining the region of a liquid crystal layer 47.

Further, non-described reference numeral 80 corresponds to the above-described cover glass. A detailed description of some parts of FIG. 2, which are substantially the same as those of FIG. 1, will be omitted because it is considered to be unnecessary.

The above-described general liquid crystal display device with the touch panel attached thereto suffers from the following problems.

In the liquid crystal display device with the touch panel attached thereto, in order to prevent the touch panel from being influenced by noise caused by driving of the liquid crystal display device, formation of the shielding transparent electrode having a sufficient thickness is required. In this case, the separate shielding transparent electrode and an additional process for forming the same are required.

Further, in this case, shielding between the touch panel and the liquid crystal panel is achieved, but formation of the separate insulting film is required. Further, patterning of the insulating film on the rear surface of the touch panel glass substrate to enable signal application is required, and thereby, additional processes and materials are required and transmittance is lowered.

Further, if electrodes are formed on both surfaces of the touch panel glass substrate, the touch panel glass substrate needs to be turned over during processes, and thereby, process time is increased and occurrence of process defects, such as generation scratches or foreign substances, is also increased.

SUMMARY OF THE INVENTION

Accordingly, the present invention is directed to a liquid crystal display device associated with a touch panel.

An object of the present invention is to provide a liquid crystal display device associated with a touch panel in which a shielding electrode is formed on the rear surface of a color filter substrate of a liquid crystal panel so as to block noise of the liquid crystal panel and to enable slimness and integration, simultaneously.

To achieve this object and other advantages and in accordance with the purpose of the invention, as embodied and broadly described herein, a liquid crystal display device associated with a touch panel includes a liquid crystal panel including a first substrate and a second substrate positioned opposite to each other and a liquid crystal layer formed between the first and second substrates, a shielding electrode formed throughout the entire rear surface of the second substrate of the liquid crystal panel, a first polarizing plate formed on the shielding electrode, a third substrate formed above the first polarizing plate and including intersecting first and second electrodes, a touch FPC formed at one side of the third substrate and including a touch drive IC to control driving and sensing of the first and second electrodes, and a printed circuit board formed at one side of the liquid crystal panel and generating a main panel control signal to control driving of the liquid crystal panel, a touch control signal to control the touch drive IC, and a voltage signal of a designated level.

The printed circuit board may be connected with the first substrate through a main panel FPC at one side of the first substrate.

The touch control signal generated by the printed circuit board may be applied to the touch drive IC through the touch FPC.

The voltage signal of the designated level generated by the printed circuit board may be applied to the shielding electrode, and the voltage signal of the designated level generated by the printed circuit board may be constant voltage or ground voltage.

The shielding electrode may be electrically connected with a ground pad electrode formed on the first substrate.

The shielding electrode may be electrically connected with the ground pad electrode through a conductive tape or through an Ag dot.

Further, the ground pad electrode may receive the voltage signal of the designated level through the printed circuit board and the main panel FPC.

The touch control signal and the voltage signal of the designated level may be simultaneously generated by the printed circuit board, and be respectively applied to the first and second electrodes and the shielding electrode.

The shielding electrode and the first and second electrodes may be transparent electrodes. Here, the shielding electrode may have a sheet resistance of less than 100Ω/□.

The first electrodes and the second electrodes may be formed on one surface of the third substrate, which is not positioned opposite to the first polarizing plate, or be formed on another surface of the third substrate, which is positioned opposite to the first polarizing plate.

The third substrate may be a glass substrate or a transparent insulating film.

An adhesive layer may be interposed between the third substrate and the first polarizing plate, or an adhesive agent applied in a closed loop shape along the edge of the first polarizing plate may be formed between the third substrate and the first polarizing plate.

The liquid crystal display device may further include a second polarizing plate on the lower surface of the first substrate.

A thin film transistor array may be provided in the first substrate, and a color filter array may be provided in the second substrate.

The liquid crystal display device may further include a cover glass on the third substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, with reference to the accompanying drawings, a liquid crystal display device associated with a touch panel in accordance with the present invention will be described in detail.

Figure 1:
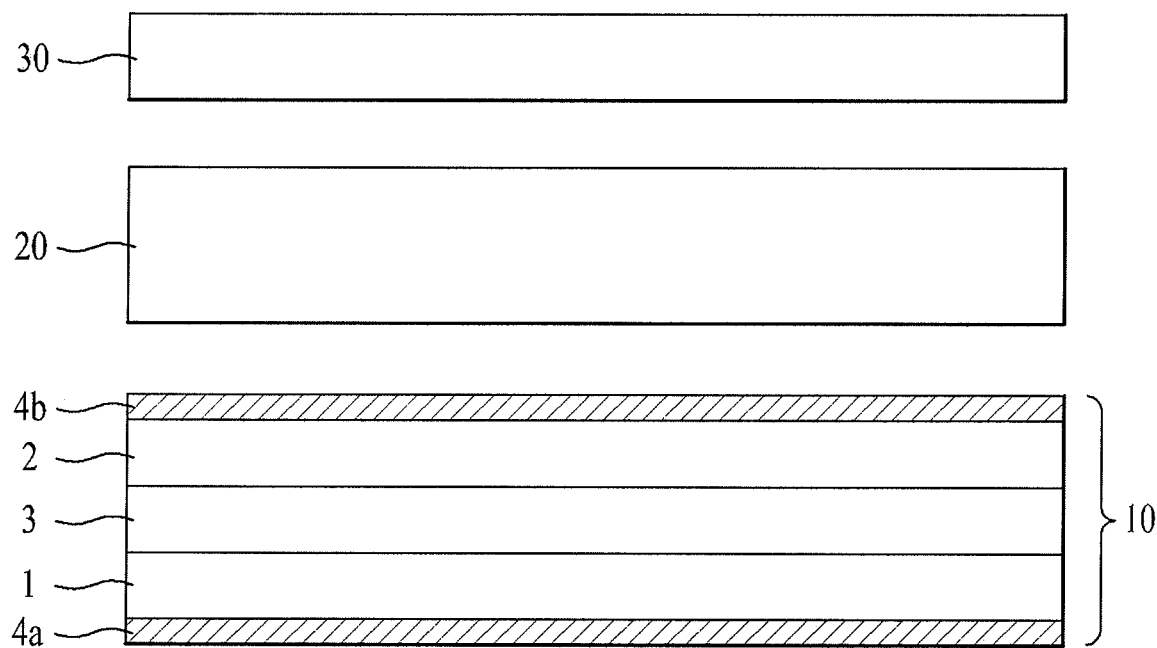
FIG. 1 is a longitudinal-sectional view of a general liquid crystal display device with a touch panel attached thereto.
Figure 2:
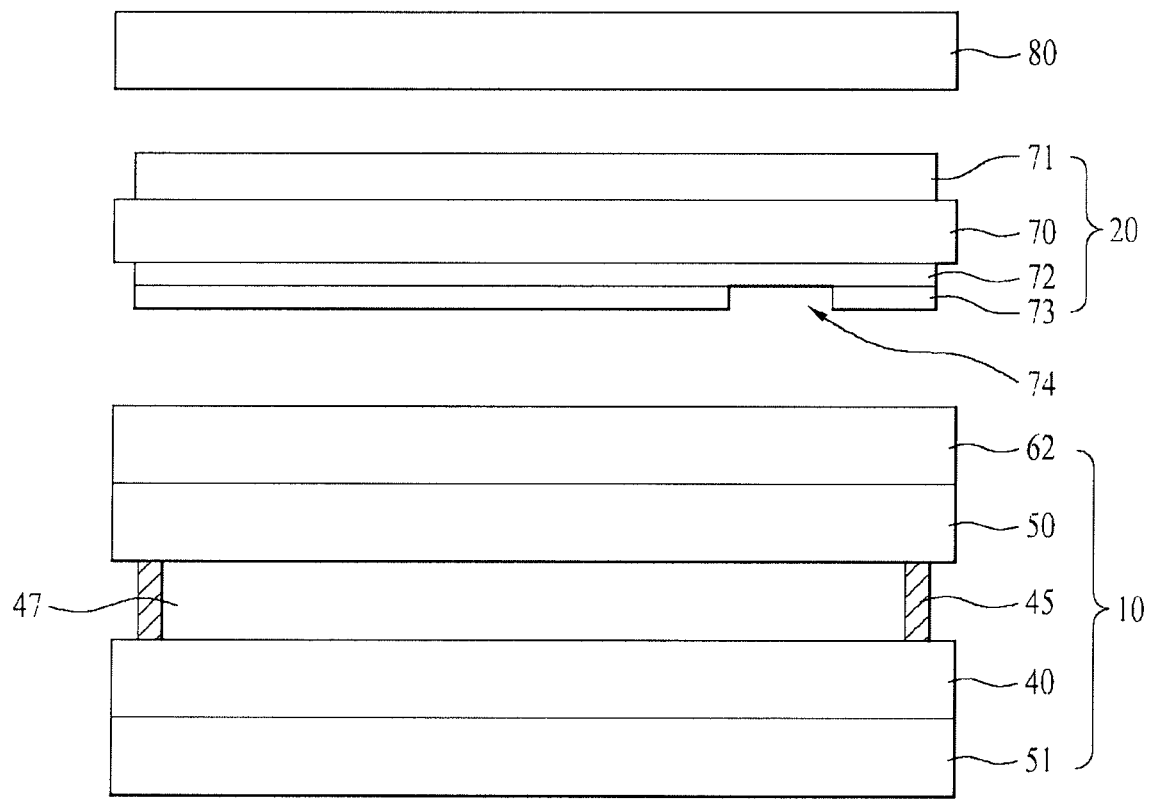
FIG. 2 is a longitudinal-sectional view illustrating a shielding method in the general liquid crystal display device with the touch panel attached thereto.
Figure 3:
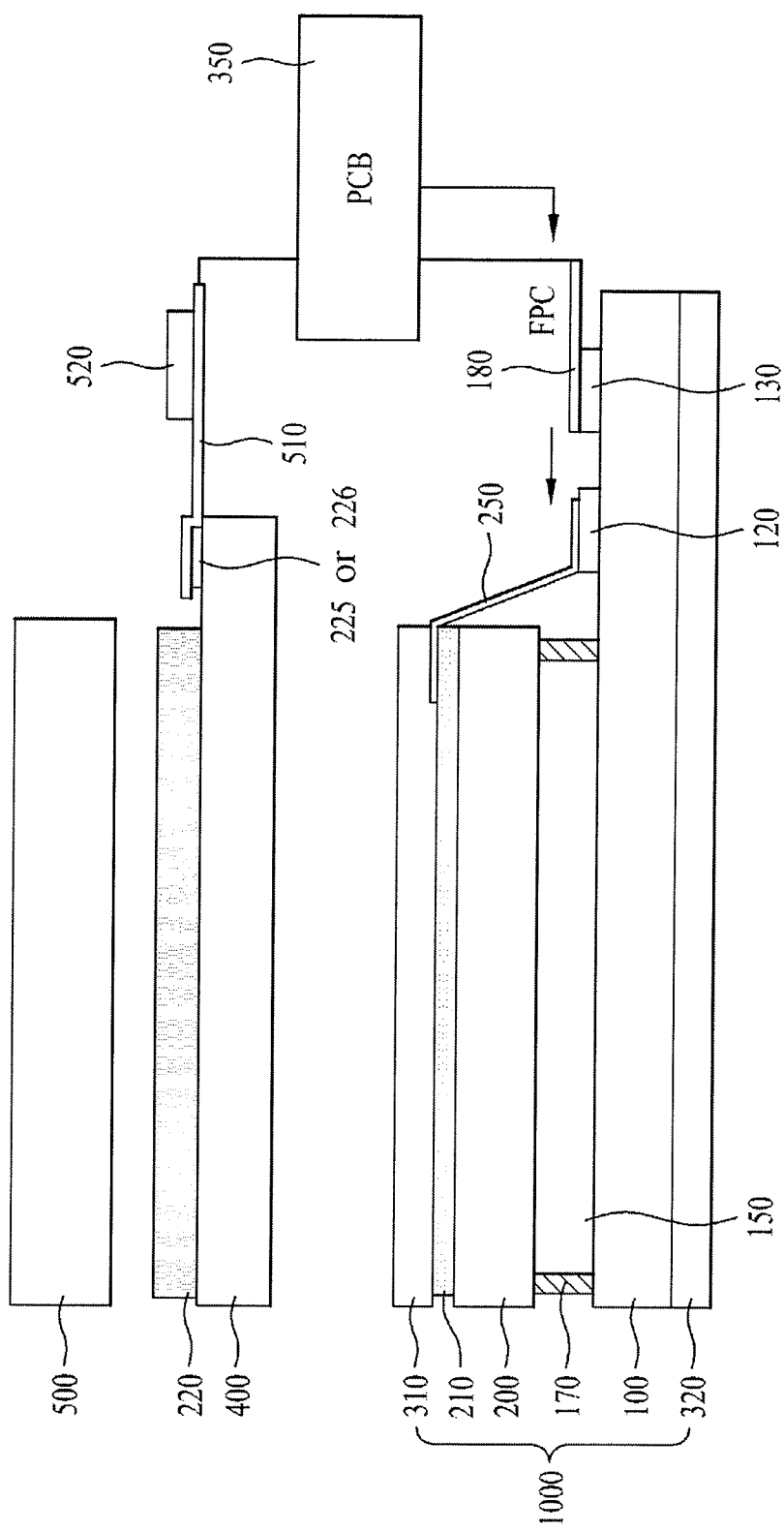
FIG. 3 is a longitudinal-sectional view of a liquid crystal display device associated with a touch panel in accordance with a first embodiment of the present invention.

FIG. 3 is a longitudinal-sectional view of a liquid crystal display device associated with a touch panel in accordance with a first embodiment of the present invention.

The liquid crystal display device in accordance with the first embodiment of the preset invention includes a main panel including a thin film transistor array substrate 100 and a color filter array substrate 200 positioned opposite to each other and a liquid crystal layer 150 formed between the thin film transistor array substrate 100 and the color filter array substrate 200, a shielding electrode 210 formed throughout the entire rear surface of the color filter array substrate 200, a first polarizing plate 310 formed on the rear surface of the color filter array substrate 200 including the shielding electrode 210, a third substrate 400 formed above the first polarizing plate 310 and provided with a sensing unit 220 including intersecting first and second electrodes formed on the upper surface thereof, a touch FPC 510 formed at one side of the third substrate 400 and including a touch drive IC 520 to control driving and sensing of the first and second electrodes, a main panel FPC 180 formed at one side of the main panel, and a printed circuit board (PCB) 350 connected to the main panel FPC 180 and generating a main panel control signal to control driving of the main panel, a touch control signal to control the touch drive IC 520, and a voltage signal of a designated level.

The PCB 350 is connected to a driving pad electrode 130 of the thin film transistor array substrate 100 through the main panel FPC 180 at one side of the thin film transistor array substrate 100. Here, the main panel FPC 180 and the PCB 350 are connected through a connector or a connection wiring line.

The touch control signal generated by the PCB 350 is applied to the touch drive IC 520 through the touch FPC 510.

Here, the touch FPC 510 is connected to touch pad electrodes 225 or 226 on the third substrate 400, and the touch pad electrodes 225 or 226 are formed together with the sensing unit 220.

Further, the voltage signal of the designated level generated by the PCB 350 is applied to the shielding electrode 210, and the voltage signal of the designated level applied to the shielding electrode 210 is preferably applied in the type of constant voltage (Vd) or ground voltage.

The shielding electrode 210 is electrically connected to a ground pad electrode 120 formed on the thin film transistor array substrate 100. Here, the ground pad electrode 120 and the shielding electrode 210 are electrically connected to each other by a conductive tape 250.

Further, the ground pad electrode 120 receives the voltage signal of the designated level through the PCB 350 and the main panel FPC 180.

Here, the touch control signal and the voltage signal of the designated level are simultaneously generated by a control unit of the PCB 350, and are respectively applied to the first and second electrodes (with reference to FIGS. 6A to 7B) of the sensing unit 220 and the shielding electrode 210.

The shielding electrode 210 and the first and second electrodes of the sensing unit 220 are all transparent electrodes. For example, the transparent electrodes may be made of Indium Tin Oxide (ITO), Indium Zinc Oxide (IZO), Indium Tin Zinc Oxide (ITZO), or Antimony Tin Oxide (ATO). These transparent electrodes serve to transmit an image of the main panel located thereunder.

A sheet resistance of the shielding electrode 210 is less than $100\Omega/1\ cm^2$. When the voltage signal of the designated level is applied to the shielding electrode 210, the shielding electrode 210 sufficiently blocks noise of the main panel, and eliminates static electricity generated during processes.

The third substrate 400 may be made of glass, in the same manner as the substrates constituting the liquid crystal panel, or may be made of a transparent insulating film, such as Polyethylene Terephthalate (PET), as needed.

If the sensing unit 220 is formed on the third substrate 400, a cover glass 500 to protect the sensing unit 220 may be further provided.

In the liquid crystal layer 150, a seal pattern 170, corresponding to the edge of the main panel, i.e., the edges of the thin film transistor array substrate 100 and the color filter array substrate 200, is formed in a space between the substrates 100 and 200, and sealed so as to bond the substrates 100 and 200 to each other. Such a liquid crystal layer 150 may be formed using a liquid crystal injecting method or a liquid crystal dropping method.

Here, the main panel including the thin film transistor array substrate 100, the color filter array substrate 200 and the liquid crystal layer 150, the first polarizing plate 310, the shielding electrode 210 formed therebetween and a second polarizing plate 320 attached to the lower surface of the thin film transistor array substrate 100 is referred to as an polarizing plate integrated liquid crystal panel 1000.

Although not shown in the drawings, an adhesion layer may be further interposed between the third substrate 400 and the first polarizing plate 310, as needed. Otherwise, instead of the adhesion layer, an adhesive agent may be applied in a closed loop shape along the edge of the first polarizing plate 310 so as to bond the third substrate 400 and the first polarizing plate 310 to each other. Here, an air gap may be made within the inner space formed by the adhesive agent.

A thin film transistor array is further provided in the thin film transistor array substrate 100, and a color filter array is further provided in the color filter array substrate 200.

Figure 4:
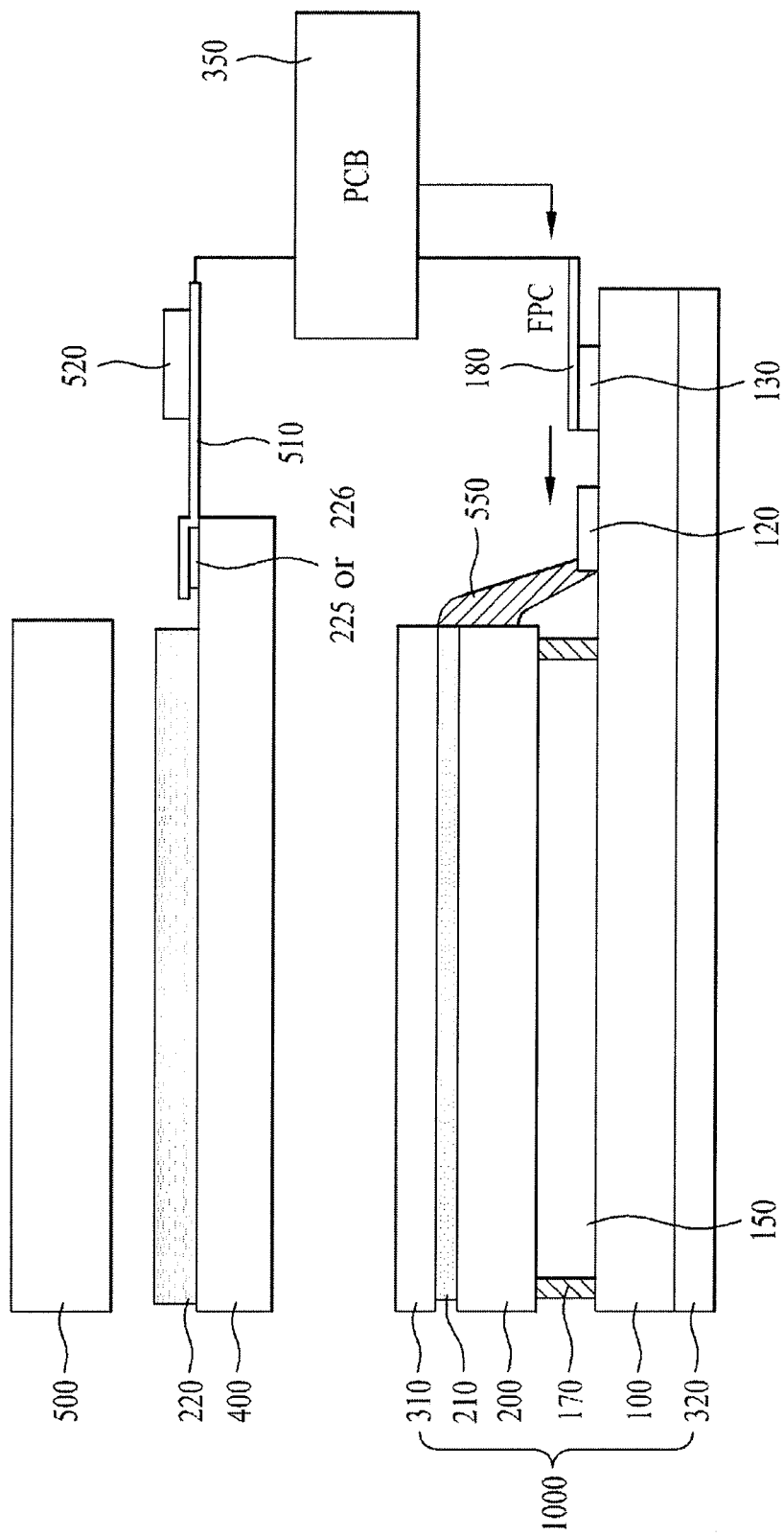
FIG. 4 is a longitudinal-sectional view of a liquid crystal display device associated with a touch panel in accordance with a second embodiment of the present invention.

FIG. 4 is a longitudinal-sectional view of a liquid crystal display device associated with a touch panel in accordance with a second embodiment of the present invention.

The liquid crystal display device in accordance with the second embodiment of the preset invention, as shown in FIG. 4, achieves electrical connection between the shielding electrode 210 and the ground pad electrode 120 through an Ag dot 550, and other parts in this embodiment are substantially the same as those in the first embodiment, and thus a detailed description of a part of the construction and operation of the second embodiment which are substantially the same as those of the first embodiment will be omitted because it is considered to be unnecessary.

In this case, the Ag dot 550 made of a conductive Ag material is formed by forming the shielding electrode 210 then bonding the Ag material from the side surfaces of the shielding electrode 210 and the color filter array substrate to the ground pad electrode 120.

After the formation of the Ag dot 550, the first polarizing plate 310 is formed on the upper surface of the shielding electrode 210.

Figure 5:
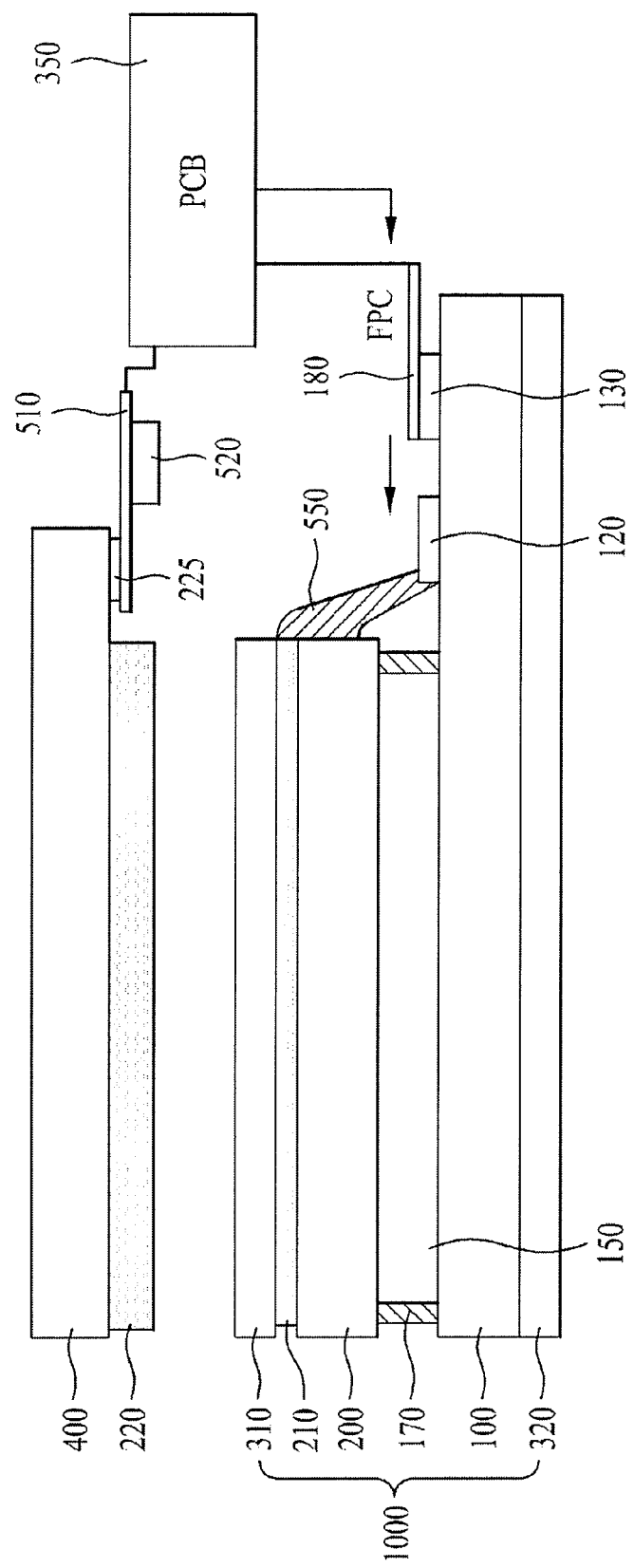
FIG. 5 is a longitudinal-sectional view of a liquid crystal display device associated with a touch panel in accordance with a third embodiment of the present invention.

FIG. 5 is a longitudinal-sectional view of a liquid crystal display device associated with a touch panel in accordance with a third embodiment of the present invention.

The liquid crystal display device in accordance with the third embodiment of the preset invention, as shown in FIG. 5, omits the cover glass 500 and includes the sensing unit 220 positioned opposite to the first polarizing plate 310, compared with the liquid crystal display device in accordance with the second embodiment. In this case, the cover glass 500 is omitted and thus one substrate may be omitted, thereby being advantageous in terms of slimness and integration of the device.

Further, the liquid crystal display device in accordance with the third embodiment has the same configuration as the liquid crystal display device in accordance with the second embodiment except that the touch FPC 510 and the touch pad electrodes 225 or 226 are formed on the lower surface of the third substrate 300 in the liquid crystal display device in the third embodiment.

Hereinafter, a configuration of the sensing unit 220 will be described in detail.

Figure 6A:
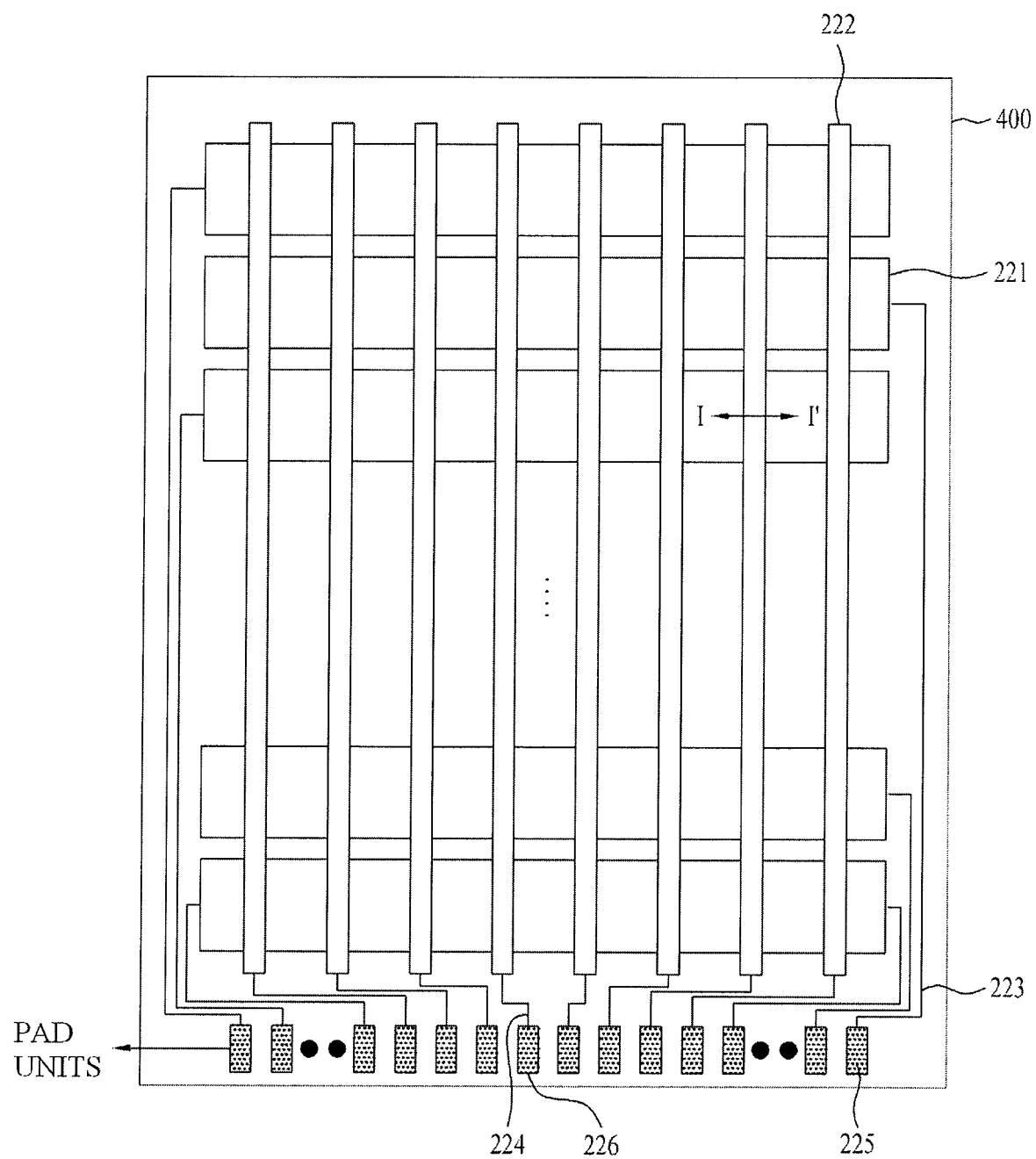
FIGS. 6A and 6B are plan and longitudinal-sectional views illustrating a configuration of a sensing unit of the liquid crystal display device associated with the touch panel in accordance with the present invention.
Figure 6B:
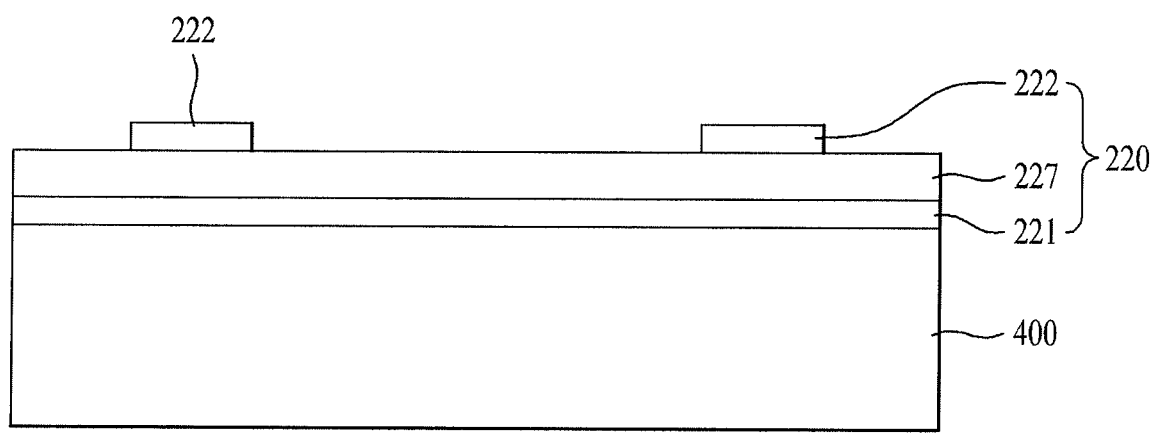

FIGS. 6A and 6B are plan and longitudinal-sectional views illustrating a configuration of the sensing unit of the liquid crystal display device associated with the touch panel in accordance with the present invention.

As shown in FIGS. 6A and 6B, first electrodes 221 and second electrodes 222 of the sensing unit 220 are formed in bar shapes intersecting each other.

In this case, a plurality of first electrodes 221 and a plurality of second electrodes 222 intersect each other, and the first electrodes 221 are separated from each other by the same interval and the second electrodes 222 are separated from each other by the same interval so as to obtain uniform sensitivity throughout all regions. Here, an insulating film 227 is formed between the first electrodes 221 and the second electrodes 222.

Voltage application pads (or touch pad electrodes) 225 corresponding to the respective first electrodes 221 and voltage detection pads (or touch pad electrodes) 226 corresponding to the respective second electrodes 222 are formed at the edge of the third substrate 400, and the first electrodes 221 and the second electrodes 222 are respectively connected to the voltage application pads 225 and the voltage detection pads 226 by first routing wiring lines 223 and second routing wiring lines 224.

Here, the first routing wiring lines 223, the second routing wiring lines 224, the voltage application pads 225 and the voltage detection pads 226 are formed in an edge region (a region except for an active region) of the substrate 400 on which the first electrodes 221 and the second electrodes 222 are formed. These voltage application pads 225 and voltage detection pads 226 are connected to the touch FPC 510 (with reference to FIGS. 3 to 5) transmitting and applying an electrical signal through the touch drive IC 520 (with reference to FIGS. 3 to 5). Further, the first routing wiring lines 223 and the second routing wiring lines 224 may be metal wiring lines as opposed to transparent electrodes in order to prevent increase of load and increase of RC delay.

Driving voltage is applied to the first electrodes 221, and the second electrodes 222 sense voltage variation according to whether or not touch is present. This method is referred to as a mutual capacitive type.

As needed, the liquid crystal display device may be driven using a method in which voltage is applied sequentially to the first and second electrodes 221 and 222 and voltage variations in the respective first and second electrodes 221 and 223 according to whether or not touch is present are detected. This method is referred to as a self capacitive type.

The first and second electrodes 221 and 222 are transparent electrodes made of Indium Tin Oxide (ITO), Indium Zinc Oxide (IZO), Indium Tin Zinc Oxide (ITZO), or Antimony Tin Oxide (ATO), as described above.

If the insulting film 227 is an inorganic insulating film, the thickness of the insulating film 227 is set to be less than 4000 Å, and if the insulating film 227 is an organic insulating film, the thickness of the insulating film 227 is set to be in the range of 1~3 μm.

Figure 7A:
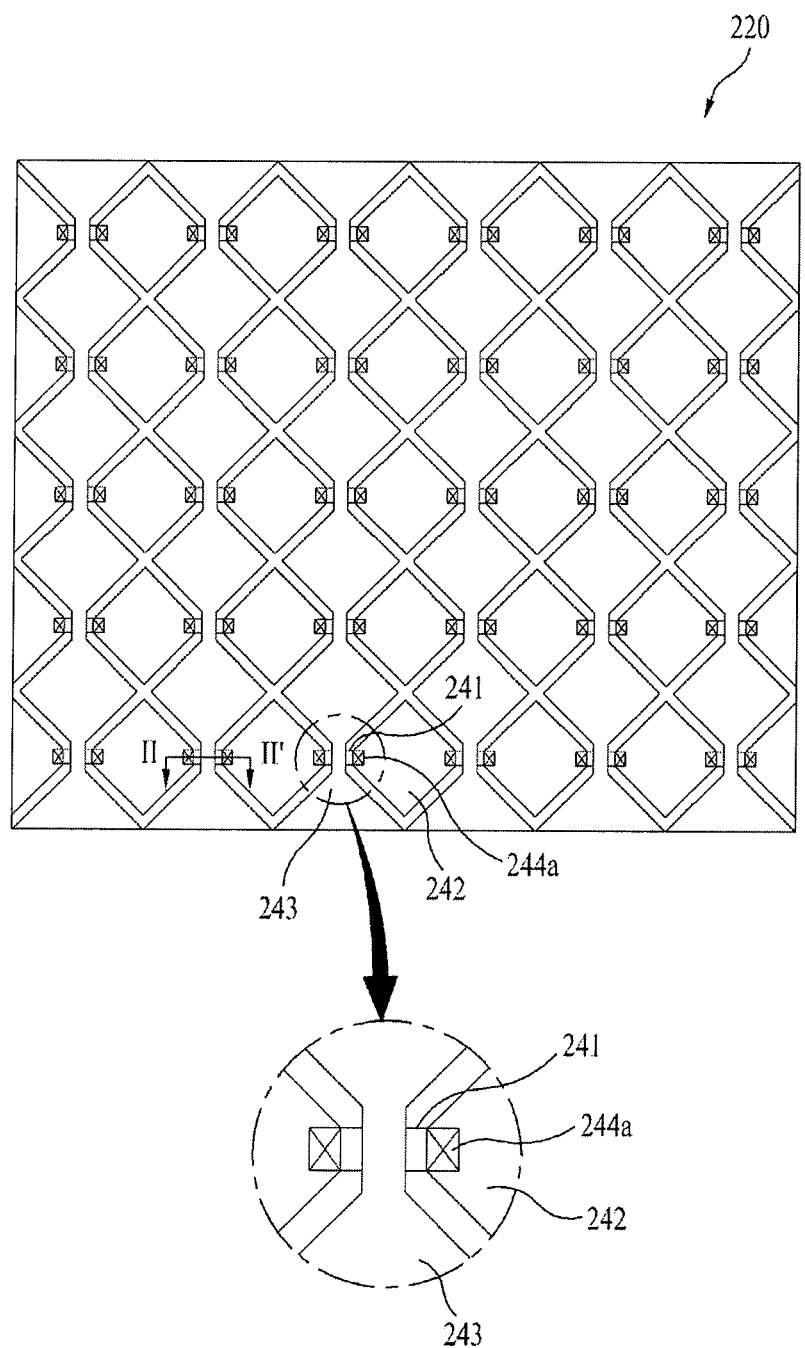
FIGS. 7A and 7B are plan and longitudinal-sectional views illustrating another configuration of the sensing unit of the liquid crystal display device associated with the touch panel in accordance with the present invention.
Figure 7B:
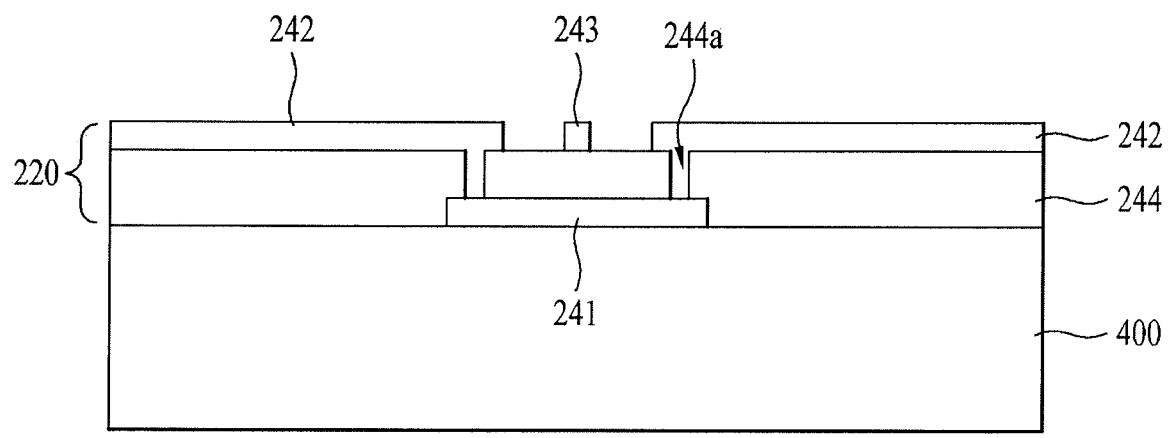

FIGS. 7A and 7B are plan and longitudinal-sectional views illustrating another configuration of the sensing unit of the liquid crystal display device associated with the touch panel in accordance with the present invention.

In the sensing unit of this configuration, first electrodes 242 and second electrodes 243 are respectively formed in diamond patterns on an insulating film 244 formed on the same layer.

The latter configuration in which the first and second electrodes 242 and 243 are formed on the same layer is advantageous in that the number of masks is reduced, compared to the former configuration.

At each of intersections of the first electrodes 242 and the second electrodes 243, the first electrodes 242, which are separated from each other, are connected through bridge electrodes 241 made of a metal component, and the second electrodes 243, which are transparent electrodes and are integrally formed, are formed to have a small line width. In this case, the second electrodes 243 are connected at the intersection, thus being formed integrally.

Here, the first electrodes 242, the second electrodes 243 and the connection parts thereof are transparent electrodes.

The bridge electrode 241 is electrically connected to an insulating film 244 formed on another layer between the first electrodes 242 through a contact hole 244a.

Further, in order to apply signals to the first electrodes 242 and the second electrodes 243, routing wiring lines and pad electrodes are formed at the edge of the third substrate 400 and are connected to the touch FPC, in the same manner as the configuration of FIG. 6A.

Although the above description illustrates that the first electrodes and the second electrodes are formed in bar shapes or diamond shapes, the first electrodes and the second electrodes may be formed in various polygonal shapes including a rectangle, a parallelogram, an octagon, and a hexagon, or a circular shape as long as the first electrodes and the second electrodes intersect each other.

Figure 8:
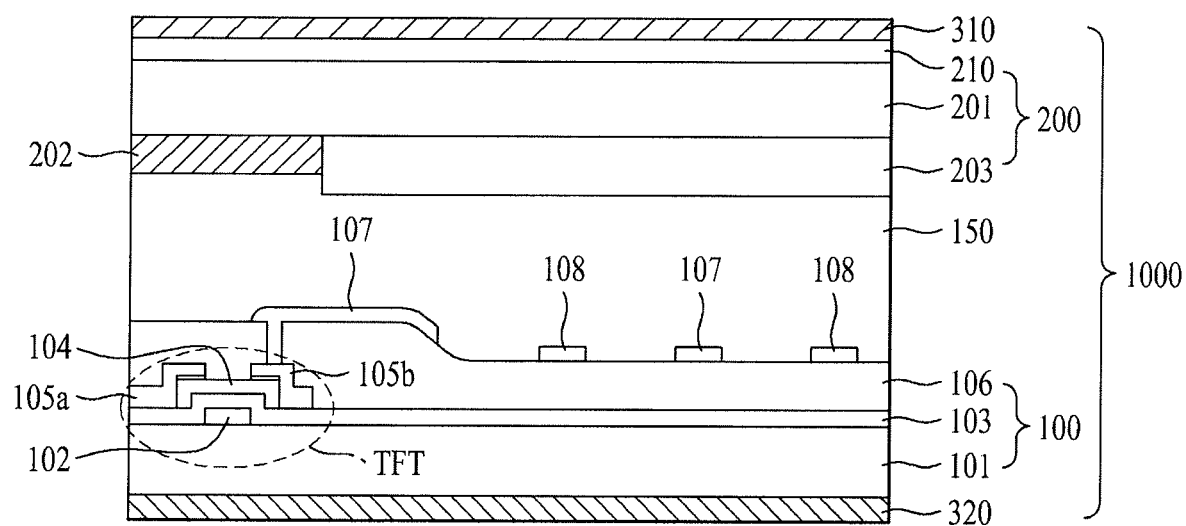
FIG. 8 is a longitudinal-sectional view illustrating an example of a liquid crystal panel of the liquid crystal display device associated with the touch panel in accordance with the present invention.

FIG. 8 is a longitudinal-sectional view illustrating an example of the liquid crystal panel of the liquid crystal display device associated with the touch panel in accordance with the present invention.

As shown in FIG. 8, for example, if the liquid crystal panel employs an In-Plane Switching (IPS) mode, the thin film transistor array substrate 100 includes a first substrate 101, gate lines and data lines intersecting each other to define pixel regions, thin film transistors TFT formed at intersections of the gate lines and the data lines, and pixel electrodes 107 and common electrodes 108 alternately formed at the pixel regions.

Here, each thin film transistor TFT includes a gate electrode 102 protruded from the gate line, a semiconductor layer 104 formed on a gate insulating film 103 interposed between the gate electrode 102 and the semiconductor layer 104 so as to cover the gate electrode 102, and a source electrode 105a and a drain electrode 105b formed at both sides of the semiconductor layer 104. The source electrode 105a is formed integrally with the data line.

Further, a passivation layer 106 is interposed between the layer of the pixel electrodes 107 and the common electrodes 108 and the layer of the source/drain electrodes 105a/105b. The pixel electrode 107 is electrically connected to the drain electrode 105b through a contact hole.

The color filter array substrate 200 includes a second substrate 201, a black matrix layer 202 formed at other regions except for the pixel regions, and a color filter layer 203 corresponding to at least the pixel regions.

In this case, the shielding electrode 210 and the first polarizing plate 310 are sequentially formed on the outer surface of the second substrate 201, and the second polarizing plate 320 is formed on the outer surface of the first substrate 101.

In case of the liquid crystal panel 100 in the IPS mode, a method in which an ITO layer is formed throughout the entire outer surface of the second substrate 201 in order to prevent static electricity is generally used. However, the ITO layer formed through such a method has an excessively small thickness and a high sheet resistance of more than 300Ω/□, and thus when the touch panel is formed directly on the liquid crystal panel 1000, noise generated by the liquid crystal panel 1000 influences the touch panel.

In order to prevent the above problem, in the liquid crystal display device associated with the touch panel in accordance with the present invention, the shielding electrode 210 having a sufficient low sheet resistance of less than 100Ω/1 cm$^2$ as opposed to a thickness or sheet resistance condition simply required to prevent static electricity is formed on the outer surface of the second substrate 201.

Further, the formation of the shielding electrode 210 is not limited to the IPS mode, and may be applied to various driving modes, for example, a Twisted Nematic (TN) mode, a VA mode, and an FFS mode. In any mode of the liquid crystal display device associated with the touch panel in accordance with the present invention, constant voltage or ground voltage of a designated level is applied to the shielding electrode 210 formed on the outer surface of the second substrate 201, thereby preventing noise generated by the lower liquid crystal panel from influencing touch driving above the shielding electrode 210.

For example, if the liquid crystal panel employs the TN mode, the liquid crystal panel in the TN mode differs from the above-described liquid crystal panel in the IPS mode in that a common electrode is further provided on the color filter array substrate 200 and the pixel electrode 107 is formed throughout the pixel region, and other parts of the liquid crystal panel in the TN mode are substantially the same as those of the liquid crystal panel in the IPS mode.

Although the above description illustrates the main panel as the liquid crystal panel, the main panel is not limited thereto. That is, the main panel may be applied to an organic light emitting diode display panel, a plasma display panel, a field emission display panel, an electrophoretic panel, and a flexible display panel having the same flat display function.

The above-described the liquid crystal display device associated with the touch panel in accordance with the present invention has effects, as follows.

First, a shielding electrode to which a ground or constant voltage signal is applied is formed on the rear surface of a color filter array substrate of a liquid crystal panel, a polarizing plate covers the shielding electrode, and the touch panel including first and second sensing electrodes intersecting each other is positioned opposite to the polarizing plate, thereby preventing driving of the liquid crystal panel from interfering with driving of the touch panel through the shielding electrode, and thus preventing noise caused by the driving of the liquid crystal panel from being introduced into the touch panel./

Second, the shielding electrode to achieve shielding between the liquid crystal panel and the touch panel is formed on the color filter array substrate, and particularly, the shielding electrode is formed by changing a material of ITO of the rear surface of the liquid crystal panel used to prevent static electricity, thereby omitting at least one ITO layer, compared with a type in which a separate shielding layer is formed on a touch panel glass substrate. In this case, advantages, such as reduction of material costs, reduction in the number of processes and yield improvement, are obtained. Further, the shielding electrode formed on the color filter array substrate has a sufficient low sheet resistance, thereby serving to prevent noise caused by driving of the liquid crystal panel from being introduced into the touch panel as well as to prevent static electricity generated during the processes.

Third, if the intersecting first and second electrodes on the touch panel glass substrate are positioned opposite to the liquid crystal panel, a separate cover glass may be omitted so that the touch panel glass substrate serves as the cover glass.

Fourth, the first and second electrodes to achieve touch sensing are formed only one surface of the touch panel glass substrate and a process of turning over the touch panel glass substrate is not required, thereby preventing defects, such as deposition of foreign substances or scratches on the rear surface of the touch panel glass substrate, and thus improving yield.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A liquid crystal display device associated with a touch panel, the liquid crystal display device comprising:
   a liquid crystal panel including a first substrate and a second substrate positioned opposite to each other and a liquid crystal layer between the first and second substrates;
   a shielding electrode throughout the entire rear surface of the second substrate of the liquid crystal panel;
   a first polarizing plate on the shielding electrode;
   a third substrate having a first surface:
   a plurality of first electrodes and second electrodes intersecting each other on the first surface of the third substrate, wherein the first surface of the third substrate is opposite to the first polarizing plate;
   a plurality of touch pads respectively corresponding to the first and second electrodes and not overlapping the first polarizing plate at one edge of the first surface of the third substrate,
   a touch flexible printed circuit (FPC) connected to the plurality of touch pads to control driving and sensing of the first and second electrodes;
   a driving pad electrode and a ground pad electrode respectively on one surface of the first substrate, wherein the driving pad electrode and the ground pad electrode are not overlapping the second substrate and the first polarizing plate;
   a main panel FPC located at the one surface of the first substrate and connected to the driving pad electrode to control driving of the liquid crystal panel; and
   a printed circuit board between the main panel FPC and the touch FPC,
   wherein the main panel FPC is connected to the printed circuit board by a first connector for supplying a voltage signal of a designated level together with a main panel control signal to the main panel FPC, and the touch FPC is connected to the printed circuit board by a second connector for supplying a touch control signal,
   wherein a touch drive IC on the touch FPC faces to the one surface of the first substrate on which the driving pad electrode and the ground pad electrode are formed,
   wherein at least one of the first and second electrodes faces to the shielding electrode by interposing the first polarizing plate between the at least one of the first and second electrodes and the shielding electrode, and
   wherein the third substrate is configured to serve as a protective cover.

2. The liquid crystal display device according to claim 1, wherein the voltage signal of the designated level is a constant voltage or a ground voltage and wherein the voltage signal of the designated level is transmitted to the shielding electrode through the main panel FPC and the ground pad electrode, and wherein an electrical connection between the ground pad electrode and the shielding electrode is provided by an Ag dot material provided at side surfaces of the shielding electrode and the second substrate, and the Ag dot material is not in contact with an upper surface of the shielding electrode.

3. The liquid crystal display device according to claim 1, wherein the shielding electrode and the first and second electrodes are transparent electrodes.

4. The liquid crystal display device according to claim 3, wherein the shielding electrode has a sheet resistance of less than 100Ω/□.

5. The liquid crystal display device according to claim 1, wherein the third substrate is a glass substrate or a transparent insulating film.

6. The liquid crystal display device according to claim 5, wherein an adhesive layer is interposed between the third substrate and the first polarizing plate.

7. The liquid crystal display device according to claim 5, wherein an adhesive agent applied in a closed loop shape along the edge of the first polarizing plate is formed between the third substrate and the first polarizing plate.

8. The liquid crystal display device according to claim 7, wherein an air gap is formed within an inner space between the third substrate and the first polarizing plate.

9. The liquid crystal display device according to claim 1, wherein a thin film transistor array is provided in the first substrate, and a color filter array is provided in the second substrate.

10. The liquid crystal display device according to claim 1, further comprising a cover glass on the third substrate.

11. The liquid crystal display device according to claim 1, wherein the main panel FPC includes a first side received by the one surface of the first substrate, and
    wherein the driving pad electrode is disposed between the one surface of the first substrate and the first side of the main panel FPC.

12. The liquid crystal display device according to claim 1, wherein an electrical connection between the ground pad electrode and the shielding electrode is formed by a conductive tape, and
    wherein the conductive tape on the shielding electrode is covered by the first polarizing plate.

13. The liquid crystal display device according to claim 1, wherein an electrical connection between the ground pad electrode and the shielding electrode is formed by bonding an Ag dot from side surfaces of the shielding electrode and the second substrate to the ground pad electrode, and
    wherein the Ag dot is not in contact with an upper surface of the shielding electrode.

14. The liquid crystal display device according to claim 1, wherein the touch FPC includes a first side received by the first surface of the third substrate and a second side for receiving the touch drive IC, and wherein the plurality of touch pads are between the first surface of the third substrate and first side of the touch FPC.

15. The liquid crystal display device according to claim 1, further comprising an insulating film formed between the first electrodes and the second electrodes.

16. The liquid crystal display device according to claim 1, wherein the third substrate protects the first and second electrodes, and
    wherein the shielding electrode is electrically insulated from the first and second electrodes by the first polarizing plate.

* * * * *